(12) United States Patent
Choi et al.

(10) Patent No.: US 6,916,764 B2
(45) Date of Patent: Jul. 12, 2005

(54) PT-RU-M1-M2 QUATERNARY METAL CATALYST BASED ON PT-RU FOR DIRECT METHANOL FUEL CELL

(75) Inventors: Kyoung Hwan Choi, Kyungki-do (KR); Seol-ah Lee, Kyungki-do (KR); Yung-eun Sung, Kwangju (KR); Kyung-won Park, Kwangju (KR); Jong-ho Choi, Kwangju (KR)

(73) Assignee: Samsung SDI Co., Ltd., Suwon-si (KR)

( * ) Notice: Subject to any disclaimer, the term of this patent is extended or adjusted under 35 U.S.C. 154(b) by 87 days.

(21) Appl. No.: 10/242,457

(22) Filed: Sep. 13, 2002

(65) Prior Publication Data

US 2003/0157393 A1 Aug. 21, 2003

(30) Foreign Application Priority Data

Feb. 19, 2002 (KR) .......................................... 2002-8760

(51) Int. Cl.$^7$ ............................................... B01J 23/56
(52) U.S. Cl. ...................... 502/326; 502/325; 502/337; 502/339; 429/40
(58) Field of Search ................................ 502/325, 326, 502/337, 339; 429/40

(56) References Cited

U.S. PATENT DOCUMENTS 5,856,036 A * 1/1999 Smotkin et al. .............. 429/40
6,284,402 B1 * 9/2001 Mallouk et al. .............. 429/40
6,517,965 B1 * 2/2003 Gorer .......................... 429/40
6,663,998 B2 * 12/2003 Norskov et al. .............. 429/40

FOREIGN PATENT DOCUMENTS

EP       0 501 930       * 9/1992

OTHER PUBLICATIONS

Reddington et al., "Combinatorial electrochemistry: A highly parallel, optical screening method for discovery of better electrocatalysts," Science, vol. 280, Iss. 5370, pp. 1735–1738, no date.*

Office Action issued by the Korean Patent Office on Jan. 29, 2004.

A.S. Arico et al, "Analysis of the Electrochemical Characteristics of a Direct Methanol Fuel Cell Based on a Pt–Ru/C Anode Catalyst", *J. Electrochem. Soc.,*, vol. 143, No. 12, Dec. 1996.

Deryn Chu and Sol Gilman, "Methanol Electro–oxidation on Unsupported Pt–Ru Alloys at Different Temperatures", *J. Electrochem. Soc.*, vol. 143, No. 5, May 1996.

* cited by examiner

*Primary Examiner*—Christina Johnson
(74) *Attorney, Agent, or Firm*—Burns, Doane, Swecker & Mathis, L.L.P.

(57) ABSTRACT

Provided is a Pt—Ru based quaternary metal anode catalyst for a direct methanol fuel cell (DMFC). The Pt—Ru based quaternary metal anode catalyst has high activity to methanol oxidation and strong resistance to catalyst poisoning due to carbon monoxide (CO), which is a byproduct of the methanol oxidation. Therefore, the Pt—Ru based quaternary metal anode catalyst can give high power density and can replace existing commercial catalysts.

12 Claims, 8 Drawing Sheets

PT-RU-M1-M2 QUATERNARY METAL CATALYST BASED ON PT-RU FOR DIRECT METHANOL FUEL CELL

BACKGROUND OF THE INVENTION

1. Field of the Invention

The present invention relates to development of a quaternary metal catalyst based on platinum (Pt)-ruthenium (Ru) for a direct methanol fuel cell (DMFC), that is, an anode catalyst, which is essential materials determining the performance of a DMFC. More particularly, the present invention relates to a quaternary metallic anode catalyst for a DMFC, consisting of platinum (Pt), ruthenium (Ru), M1 and M2, the M1 and M2 being selected among transition metals from Groups V–XI of the Periodic Table of the Elements, respectively.

2. Description of the Related Art

Recently, as portable electronic devices and cordless communication equipments have been rapidly developed, much attention is being paid to development of fuel cells as portable power sources, fuel cells for pollution-free automobiles and power-generation systems as clean energy sources.

A fuel cell is a new power generation system for directly converting the chemical energy of fuel (gas), e.g., hydrogen or methanol, and an oxidizer, e.g., oxygen or air, into electrical energy. There are several different fuel cells: molten carbonate fuel cells operating at higher temperatures of approximately 500 to approximately 700° C.; phosphoric acid fuel cells operating at approximately 200° C.; alkaline electrolyte fuel cells and polymer electrolyte fuel cells operating at below 100° C. or at room temperature.

The polymer electrolyte fuel cell is subdivided into a proton exchange membrane fuel cells (PEMFC) using hydrogen gas and a direct methanol fuel cell (DMFC) using liquid methanol, according to anode fuel. The polymer electrolyte fuel cell, which is a source of future clean energy that can replace fossil energy, has high power density and high energy conversion efficiency. Also, the polymer electrolyte fuel cell can operate at room temperature and can be made miniaturized. Thus, the polymer electrolyte fuel cell has very wide applications including zero-emission vehicles, home power generation systems, and power source for mobile communications equipment, medical appliances and military equipment for example.

In general, a proton exchange membrane fuel cell using hydrogen is advantageous in that it has high power density, but cautious handling of hydrogen gas is needed and there is demand for an additional facility, such as a fuel reforming apparatus for reforming methane, methanol or natural gas to produce hydrogen fuel.

On the other hand, although having lower power density than gaseous fuel cells, a direct methanol fuel cell is considered to be suitable as a small and general-purpose portable power source from the viewpoints of manageability, low operation temperatures and lack of necessity of additional fuel reforming apparatus.

Referring to FIG. 1, a fuel cell is constructed such that a proton exchange membrane 11 is interposed between an anode and a cathode. The proton exchange membrane 11 has a thickness of 50 to 200 μm and is made of solid polymer electrolyte. Each of the anode and cathode of such a cell includes a gas diffusion electrode consisting of a support layer 14, 15 for supply and diffusion of each reactant gas and a catalyst layer 12, 13 at which oxidation/reduction of the reactant gas occur (the anode and the cathode may also be collectively termed a gas diffusion electrode), and a current collector 16.

In the anode of a DMFC, methanol oxidation occurs to produce protons and electrons. The produced protons and electrons are transferred to the cathode. In the cathode, the protons react with oxygen, that is, reduction occurs. An electromotive force based on electrons from anode to cathode is an energy source of a fuel cell. The following reaction equations represent reactions occurring in the anode and cathode and an overall reaction occurring in the single cell.

[Anode (Negative Electrode)]

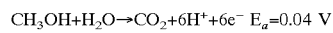
$$CH_3OH+H_2O \rightarrow CO_2+6H^++6e^- \quad E_a=0.04 \text{ V}$$

[Cathode (Positive Electrode)]

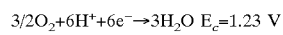
$$3/2O_2+6H^++6e^- \rightarrow 3H_2O \quad E_c=1.23 \text{ V}$$

[Single Cell]

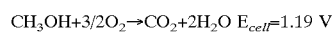
$$CH_3OH+3/2O_2 \rightarrow CO_2+2H_2O \quad E_{cell}=1.19 \text{ V}$$

The overall performance of a fuel cell is greatly influenced by the performance of anode materials because the anode reaction rate is slow. Thus, in order to realize commercialization of DMFCs, development of superb catalysts for methanol oxidation is quite important.

While the methanol is electroadsorbed onto the platinum surface and oxidized to make protons and electrons, the catalyst poison which is linearly bonded carbon monoxide on Pt to make Pt useless is produced.

It was reported that resistance to catalyst poison in a platinum (Pt) catalyst could be enhanced by combining ruthenium (Ru) with Pt, preferably in the atomic ratio of 50:50 (D. Chu and S. Gillman, J. Electrochem. Soc. 1996, 143, 1685). The enhanced resistance to carbon monoxide is based on the ability of Ru adsorbing $H_2O$ molecules at chemical potentials where methanol is adsorbed on Pt. This bifunctional mechanism explains the promotion of catalyst activity by interaction of transition metals and is represented by the following reaction.

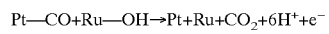
$$Pt-CO+Ru-OH \rightarrow Pt+Ru+CO_2+6H^++e^-$$

In DMFCs, anode materials are being developed predominantly using a Pt—Ru binary alloy catalyst, which is already partially commercialized. Thus, much research is focusing on Pt based binary anode catalysts such as Pt—Mo, Pt—W, Pt—Sn or Pt—Os, and Pt—Ru based ternary catalysts such as Pt—Ru—Os or Pt—Ru—Ni. However, the use of the binary catalysts or ternary catalysts makes it difficult to obtain both a bifunctional effect and an electronic effect. Therefore, the present invention proposes quaternary metallic catalysts which are effectively used for methanol oxidation. Actually, the quaternary metallic catalysts have been difficult to be practically used because they have difficulty in alloying between metals. Both the bifunctional effect and the electronic effect can be obtained from the use of the quaternary metallic catalysts, making it possible to increase the catalyst activity effectively. Although it is not easy to develop quaternary metallic catalysts due to the difficulty of metallic solubility and the catalyst design, the quaternary metallic catalysts are being expected to exhibit good catalyst activity compared with existing catalysts. The phase equilibrium, atomic bonding strength and knowledge of catalyst activity are vital parameters in selecting elements and determining combination ratios of such elements. The inventors carried out experiments on various transition metals for attainment of new anode catalysts having better performance than conventional anode catalysts. The experiments have ascertained that the quaternary anode catalysts according to the present invention promote CO oxidation by adding easily-OH-adsorbing metals and weaken CO—Pt bond by changing the electronic structure between atoms, thereby mitigating CO poisoning to thus increase catalyst activity, and improving performance of fuel cells.

SUMMARY OF THE INVENTION

To solve the above-described problems, it is an object of the present invention to provide a quaternary metal catalyst based on platinum (Pt)-ruthenium (Ru) for a direct methanol fuel cell (DMFC) having resistance to catalyst poisoning and high activity to methanol oxidation.

It is another object of the present invention to provide a fuel cell electrode having the quaternary metal catalyst based on Pt—Ru for a DMFC.

It is still another object of the present invention to provide a DMFC having the fuel cell electrode.

To accomplish the first object of the present invention, there is provided a quaternary metal catalyst for a fuel cell comprising platinum (Pt), ruthenium (Ru), M1 and M2, wherein M1 and M2 are different metals selected from the group consisting of rhodium (Rh), nickel (Ni) and osmium (Os).

In the quaternary metal catalyst, the Pt, Ru and M1 and M2 are preferably contained in amounts of 40 to 70%, 10 to 40%, 5 to 20% and 5 to 20% by mole, respectively.

Also, the Pt, Ru, Rh and Ni are preferably contained in amounts of 40 to 65%, 10 to 40%, 5 to 20% and 5 to 20% by mole, respectively.

Preferably, the Pt, Ru, Rh and Os are contained in amounts of 40 to 70%, 10 to 40%, 5 to 15% and 5 to 10% by mole, respectively.

The Pt, Ru, Ni and Os are preferably contained in amounts of 40 to 65%, 10 to 40%, 5 to 20% and 5 to 10% by mole, respectively.

In another aspect of the present invention, there is provided a fuel cell electrode comprising the quaternary metal catalyst.

In still another aspect of the present invention, there is provided a direct methanol fuel cell comprising the fuel cell electrode.

The proposed Pt—Ru-M1-M2 quaternary metal catalysts according to the present invention have bifunctional, electronic effect and ensemble effect, exhibiting high activity to methanol oxidation. Also, the Pt—Ru-M1-M2 quaternary metal catalysts according to the present invention have strong resistance to byproducts generated during oxidation and have oxidation capability. That is to say, Ru and Os having bifunctional effects provide oxygen adsorbing capability, causing further oxidation of carbon monoxide (CO). Unlike Ru, Ni changes the electronic structure of Pt, thereby weakening bondability of Pt—CO. Rh exhibits the property having the bifunctional and electronic effects.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
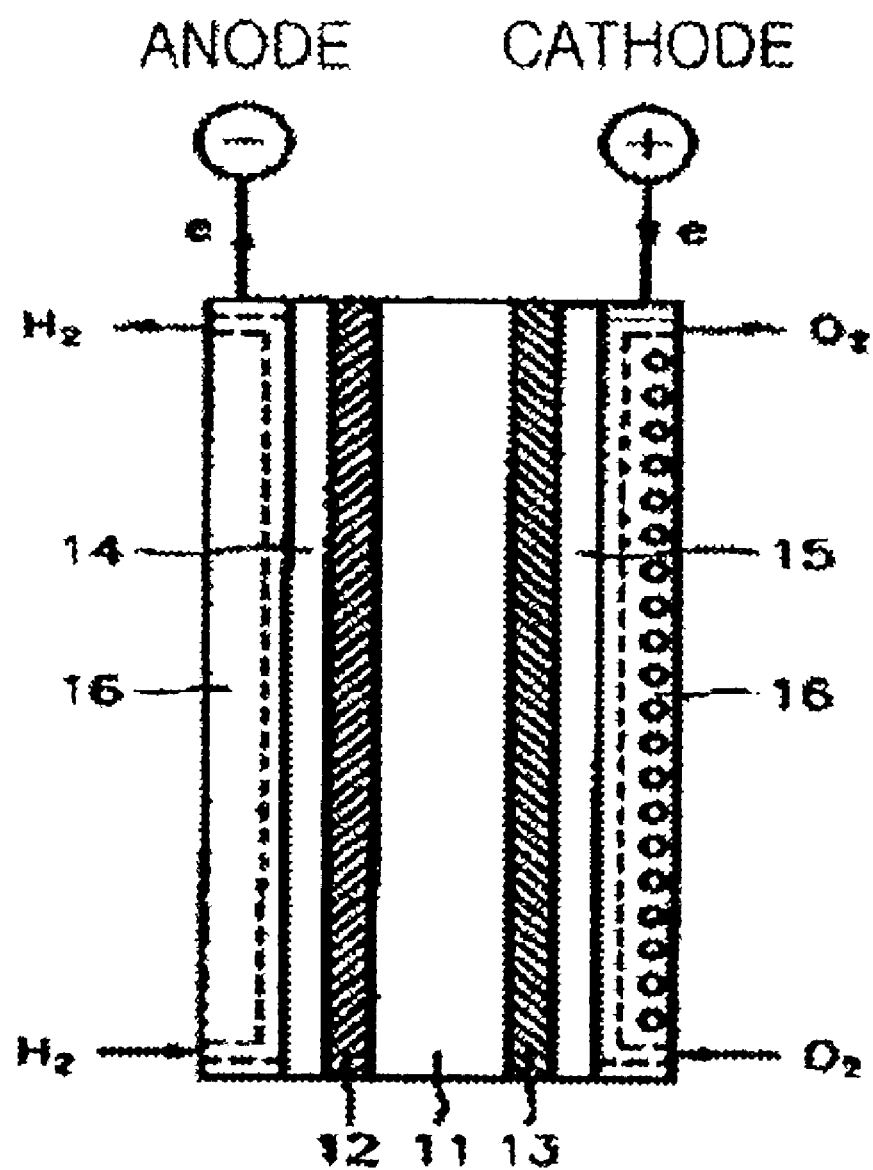
FIG. 1 is a schematic diagram of a fuel cell.

A method for preparing an anode catalyst according to the present invention will now be described in more detail.

The metal salts of Pt, Ru, Rh, Os and Ni are not specifically restricted and chlorides, nitrides and sulfuric salts of these metals may be used. Examples of the metal salts include a Pt metal salt ($H_2PtCl_6 \cdot xH_2O$), a Ru metal salt ($RuCl_3 \cdot xH_2O$), a Rh metal salt ($RhCl_3$), an Os metal salt ($OsCl_3 \cdot xH_2O$), a Ni metal salt ($NiCl_2 \cdot xH_2O$) and so on. Although the metal salts used in the present invention were ones available from Aldrich, metal salts manufactured by another companies can be used as well. Also, another types of metal salts, e.g., $K_2PtCl_6$, can be used in the present invention.

Appropriate amounts of metal salts are used according to molar ratio of metals desirably used in the quaternary metal catalysts to be mixed with distilled water, respectively, followed by stirring at room temperature, thereby obtaining respective aqueous solutions of the metal salts. The respective aqueous solutions are mixed and stirred.

The pH of a mixed solution is adjusted to be in the range of 7 to 8, and a reducing agent is added thereto at a time, thereby reducing the metal salts to yield precipitates. The obtained precipitates are washed with distilled water and freeze-dried, thereby finally synthesized metal catalysts. An XRD analysis for the synthesized metal catalysts shows peaks corresponding to the respective metal elements in the XRD pattern, confirming that appropriate quaternary metal catalysts have prepared. Usable reducing agents include $NaBH_4$, $N_2H_4$ and $HCOONa$.

The quaternary metal catalyst prepared by the above-described method includes Pt, Ru, M1 and M2. The M1 and M2 are different metals selected from the group consisting of Rh, Ni and Os. The composition of the quaternary metal catalyst comprises 40 to 70% by mole of Pt, 10 to 40% by mole of Ru, and each 5 to 20% by mole of M1 and M2. If the composition is out of the above range, the activity of quaternary catalyst is not good, making it difficult to form a solid solution to function as a quaternary metal catalyst, and it is impossible to take advantage of both bifunctional effect and electronic effects.

For comparison of activities to methanol oxidation, onset voltages of the methanol oxidation of the presently invented catalyst in a three-electrode cell using a Pt wire as a counter electrode, and Ag/AgCl as reference electrodes were measured in 0.5 M sulfuric acid solution and 2M methanol/0.5 M sulfuric acid solution. Even if the same metals are used in synthesizing catalysts, different activities to methanol oxidation are exhibited according to the composition of the metals used.

Then, changes in current are measured for 30 minutes with applying a constant voltage of 0.3 V vs. Ag/AgCl in 2 M methanol/0.5 M sulfuric acid solution. The measured current values are divided by the initial current value for normalization. The normalized current values are relatively compared, thereby determining stability of the synthesized catalysts under the applied voltage condition.

For a catalyst to exhibit excellent performance, the catalyst must meet requirements of having a low onset voltage with respect to a methanol oxidation reaction and maintaining a constant normalized current density from the viewpoints of activity and stability.

The method for preparing a quaternary metal catalyst can also be applied to catalyst preparation including impregnating a catalyst in a porous carrier such as carbon black, activated carbon or carbon fiber.

The invention is further illustrated by the following examples. All references made to these examples are for the purposes of illustration. It should be understood that the invention is not limited to the specific details of the examples.

EXAMPLE 1

Preparation of Pt—Ru—Rh—Ni Quaternary Metal Catalyst and Performance Test

Appropriate amounts of a Pt metal salt ($H_2PtCl_6 \cdot xH_2O$), a Ru metal salt ($RuCl_3 \cdot xH_2O$), a Rh metal salt ($RhCl_3$) and a Ni metal salt ($NiCl_2 \cdot H_2O$) were picked in molar ratios of (a) 4:4:1:1, (b) 4:1:1:1, (c) 4:2:2:2, (d) 5:4:0.5:0.5, (e) 6:3:0.5:0.5, (f) 6.5:2.5:0.5:0.5 and (g) 4:3:2:1. Each of the metal salts was added to distilled water and stirred for 3 hours at room temperature (25° C.), followed by mixing the respective metal salt solutions and stirring for another 3 hours.

The pH of the mixed solution of the respective metal salt solutions was adjusted to 8, and three times excess of stoichiometric demand of a 2 M $NaBH_4$ aqueous solution as a reducing agent was added thereto at a time, thereby reducing the metal salts to yield precipitates. The obtained precipitates were washed with distilled water three times and freeze-dried for 12 hours, thereby finally synthesized metal catalysts. Performance tests were carried out on the synthesized metal catalysts.

Figure 2:
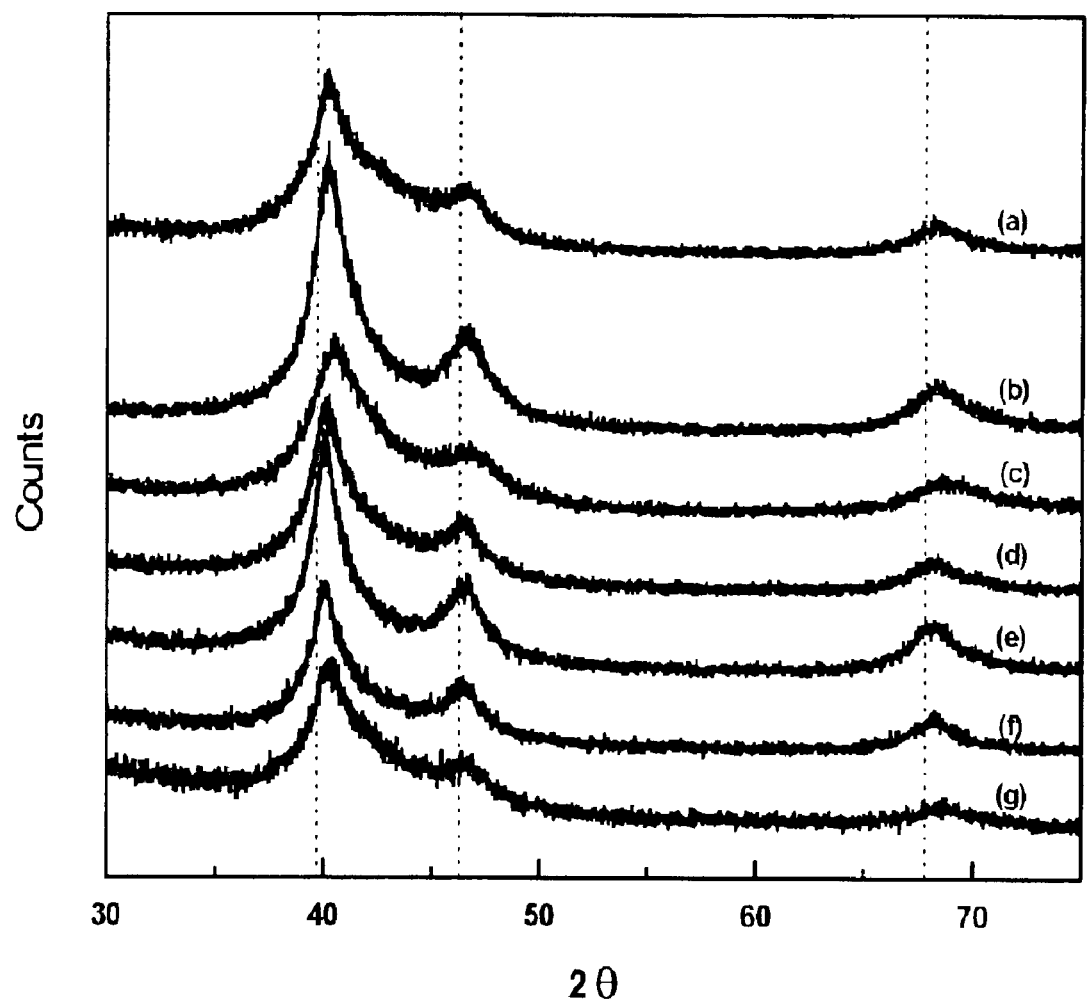
FIG. 2 shows X-ray diffraction (XRD) patterns of Pt—Ru—Rh—Ni quaternary metal catalysts according to the present invention depending on a change in 2.

FIG. 2 shows X-ray diffraction (XRD) patterns of the synthesized metal catalysts having various molar compositions, in which Pt, Ru, Rh and Ni catalysts are mixed in molar ratios of (a) 4:4:1:1, (b) 4:1:1:1, (c) 4:2:2:2, (d) 5:4:0.5:0.5, (e) 6:3:0.5:0.5, (f) 6.5:2.5:0.5:0.5, and (9) 4:3:2:1. XRD analysis shows that there are no independent peaks corresponding to Ru, Rh and Ni, and peaks corresponding to Pt contained in the synthesized catalysts are slightly shifted toward higher angles than peaks corresponding to pure Pt indicated by dotted lines, confirming that the catalysts have been synthesized in appropriate amount ratios of Pt, Ru, Rh and Ni (A. Arico, *J. Electrochem. Soc.* 1996, 143, 3950).

Table 1 shows onset voltages at which methanol oxidation by the quaternary metal catalysts are initiated. Referring to Table 1, onset voltages of the quaternary metal catalysts are lower than that (0.291 V) of a conventional Pt—Ru binary anode catalyst whose performance test was carried out in Comparative Example 1 to be described later, confirming higher catalytic activity.

TABLE 1

Onset voltages of Pt—Ru—Rh—Ni catalysts for methanol oxidation

| Molar ratio of Pt—Ru—Rh—Ni | Onset voltage [V] |
| --- | --- |
| (a) 4:4:1:1 | 0.266 |
| (b) 4:1:1:1 | 0.251 |
| (c) 4:2:2:2 | 0.255 |
| (d) 5:4:0.5:0.5 | 0.264 |
| (e) 6:3:0.5:0.5 | 0.254 |
| (f) 6.5:2.5:0.5:0.5 | 0.236 |
| (g) 4:3:2:1 | 0.278 |

The above electrochemical analysis was carried out on a three-electrode cell using a Pt wire as a counter electrode, and Ag/AgCl as a reference electrode at room temperature. Measurement of the catalytic activity was carried out in 0.5 M sulfuric acid solution and 2M methanol/0.5 M sulfuric acid solution for comparison of activities with respect to methanol oxidation. Even if the same metals were used in synthesizing the catalysts, different activities to methanol oxidation were exhibited according to the composition of metals used. As listed in Table 1, the onset voltages of the quaternary metal catalysts (a) through (g) according to the present invention are lower than the onset voltage of the conventional Pt—Ru binary catalyst, i.e., approximately 0.291 V, providing better catalytic activity than that in the conventional catalyst.

Figure 3:
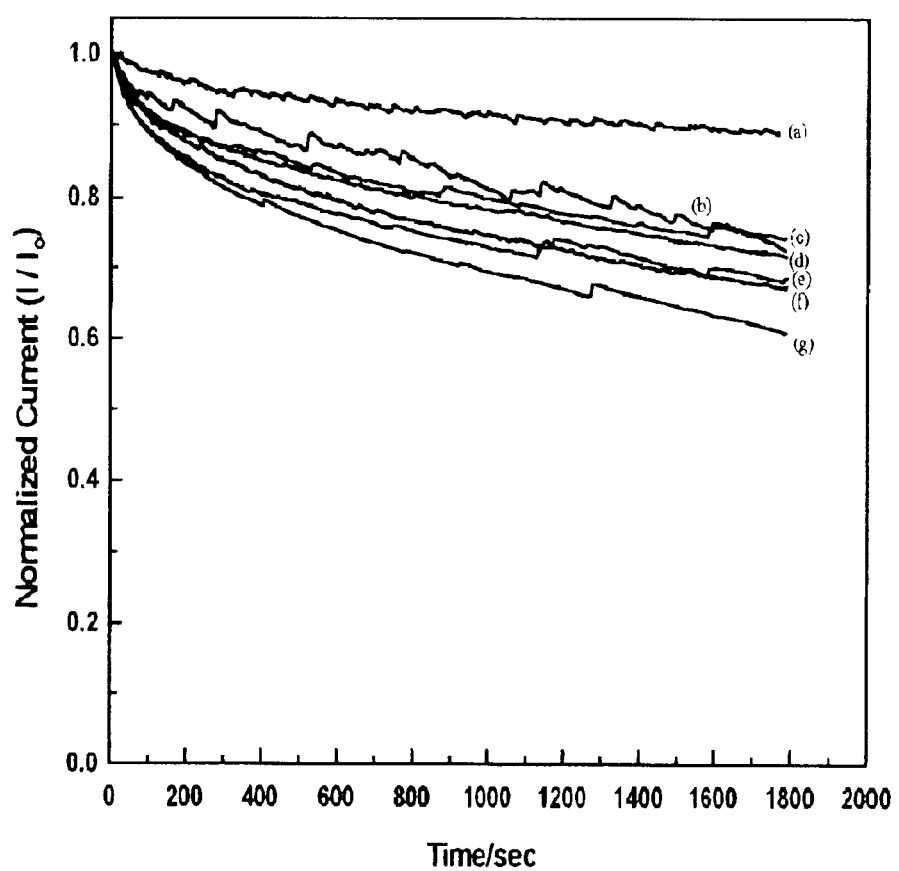
FIG. 3 shows normalized current densities for the Pt—Ru—Rh—Ni quaternary metal catalysts according to the present invention.

FIG. 3 is a graphical representation for comparing changes in current measured for 30 minutes with applying a constant voltage (0.3 V vs. Ag/AgCl) in 2 M methanol/0.5 M sulfuric acid solution, with values obtained by dividing the measured current values by the initial current value for normalization. In FIG. 3, Pt, Ru, Rh and Ni catalysts are mixed in molar ratios of (a) 4:3:2:1, (b) 5:4:0.5:0.5, (c) 6.5:2.5:0.5:0.5, (d) 4:2:2:2, (e) 6:3:0.5:0.5, (f) 4:4:1:1, and (g) 4:1:1:1. The comparison results showed stability of the synthesized catalysts under the condition of applying voltages to electrodes.

For a catalyst to exhibit excellent performance, the catalyst preferably has a lower onset voltage with respect to a methanol oxidation reaction, as listed in Table 1, and also preferably maintains a constant normalized current density, as shown in FIG. 3.

The method for preparing the quaternary metal catalyst according to the present invention can also be applied to catalyst preparation including impregnating a catalyst in a porous carrier such as carbon black, activated carbon or carbon fiber. Currently, the method for preparing the quaternary metal catalyst according to the present invention is being applied for a single cell using synthesized catalysts without carriers. However, in order to reduce the amount of catalysts used, research and development of methods for preparing catalysts using the carriers are required in the future.

EXAMPLE 2

Preparation of Pt—Ru—Rh—Os Quaternary Anode Catalysts and Performance Test

A Pt metal salt ($H_2PtCl_6 \cdot xH_2O$), a Ru metal salt ($RuCl_3 \cdot xH_2O$), a Rh metal salt ($RhCl_3$) and an Os metal salt ($OsCl_3 \cdot xH_2O$) were mixed in the same manner as in Example 1 to be desired molar ratios, except that the compositions thereof were different, thereby preparing metal catalysts. Performance test was carried out on the synthesized metal catalysts.

Figure 4:
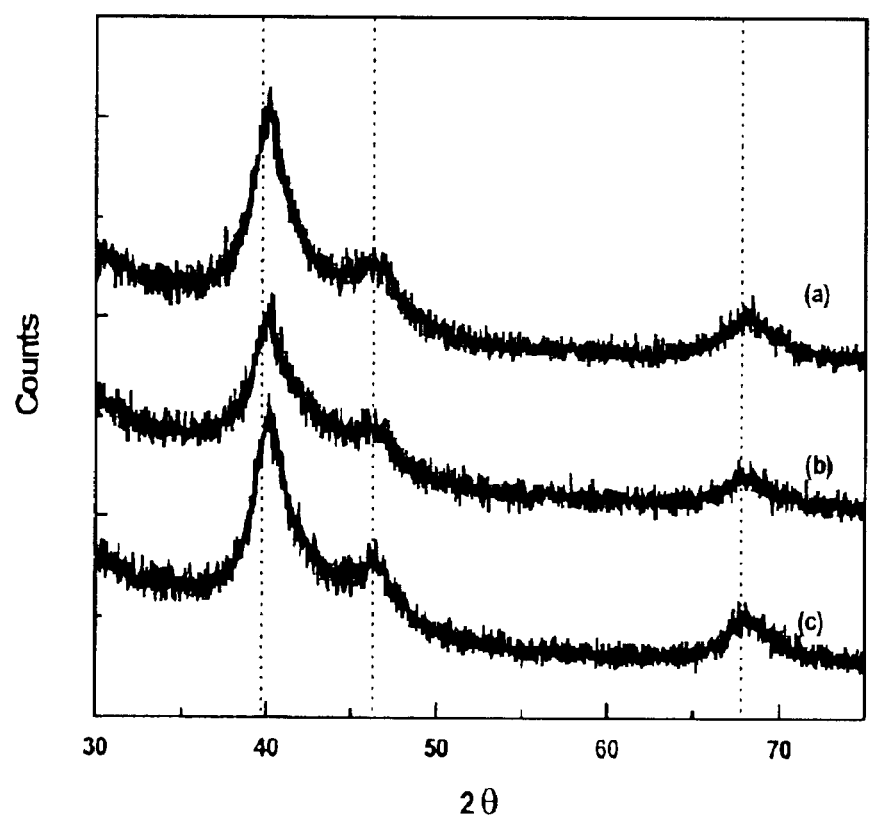
FIG. 4 shows X-ray diffraction (XRD) patterns of Pt—Ru—Rh—Os quaternary metal catalysts according to the present invention depending on a change in 2.

FIG. 4 shows X-ray diffraction (XRD) patterns of the synthesized metal catalysts having various molar compositions, in which Pt, Ru, Rh and Os catalysts are mixed in molar ratios of (a) 7:1:1:1, (b) 6:3:0.5:0.5, and (c) 6:2:1.5:0.5. XRD analysis confirms that four metals are alloyed.

Table 2 shows onset voltages at which methanol oxidation by the quaternary metal catalysts are initiated, according to various compositions. Referring to Table 2, onset voltages of the Pt—Ru—Rh—OS quaternary metal catalysts are lower than that of the conventional Pt—Ru binary anode catalyst which was 0.291 V, showing better catalytic activity than the conventional PtRu catalyst.

TABLE 2

Onset voltages of Pt—Ru—Rh—Os catalysts for methanol oxidation

| Molar ratio of Pt—Ru—Rh—Os | Onset voltage [V] |
| --- | --- |
| (a) 7:1:1:1 | 0.240 |
| (b) 6:3:0.5:0.5 | 0.237 |
| (c) 6:2:1.5:0.5 | 0.267 |

Figure 5:
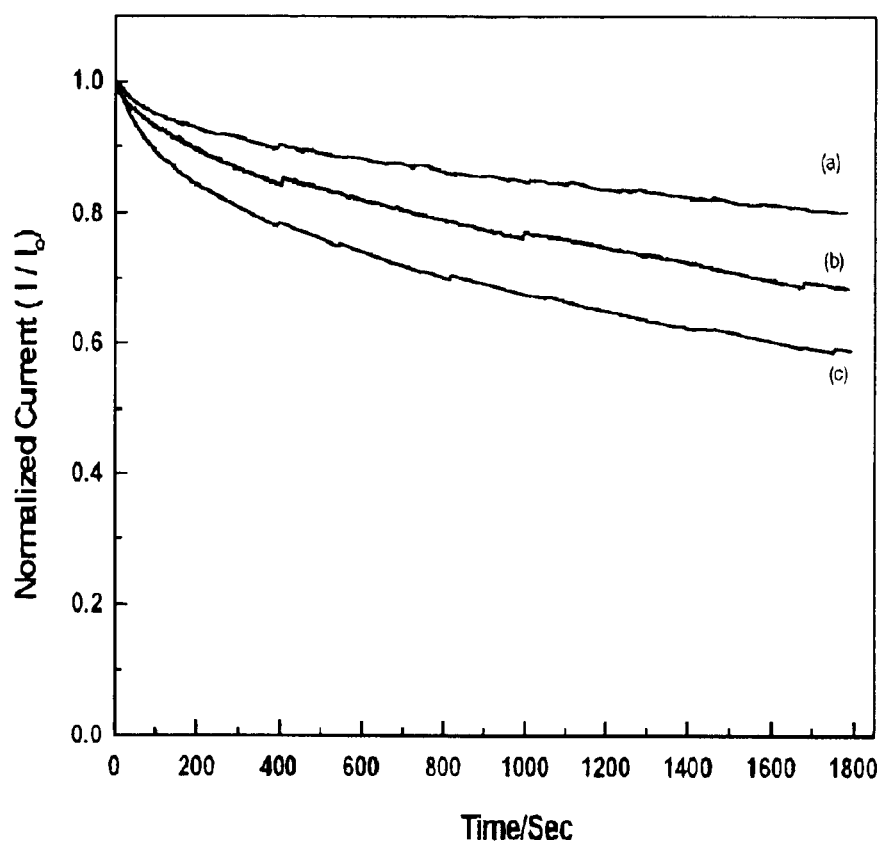
FIG. 5 shows normalized current densities for the Pt—Ru—Rh—Os quaternary metal catalysts according to the present invention.

FIG. 5 is a graphical representation for comparing normalized current changes at 0.3V measured for 30 minutes with applying same condition explained in Example 1. In FIG. 5, Pt—Ru—Rh—Os catalysts are mixed in molar ratios of (a) 7:1:1:1, (b) 6:3:0.5:0.5, and (c) 6:2:1.5:0.5. The comparison results showed stability of the synthesized catalysts under the condition of applying voltages to electrodes.

EXAMPLE 3

Preparation of Pt—Ru—Os—Ni Quaternary Anode Catalysts and Performance Test

A Pt metal salt ($H_2PtCl_6 \cdot xH_2O$), a Ru metal salt ($RuCl_3 \cdot xH_2O$), an Os metal salt ($OsCl_3 \cdot xH_2O$) and a Ni metal salt ($NiCl_2 \cdot xH_2O$) and were mixed in the same manner as in Example 1 to be desired molar ratios, except that the compositions thereof were different, thereby preparing metal catalysts. Performance test was carried out on the prepared catalysts.

Figure 6:
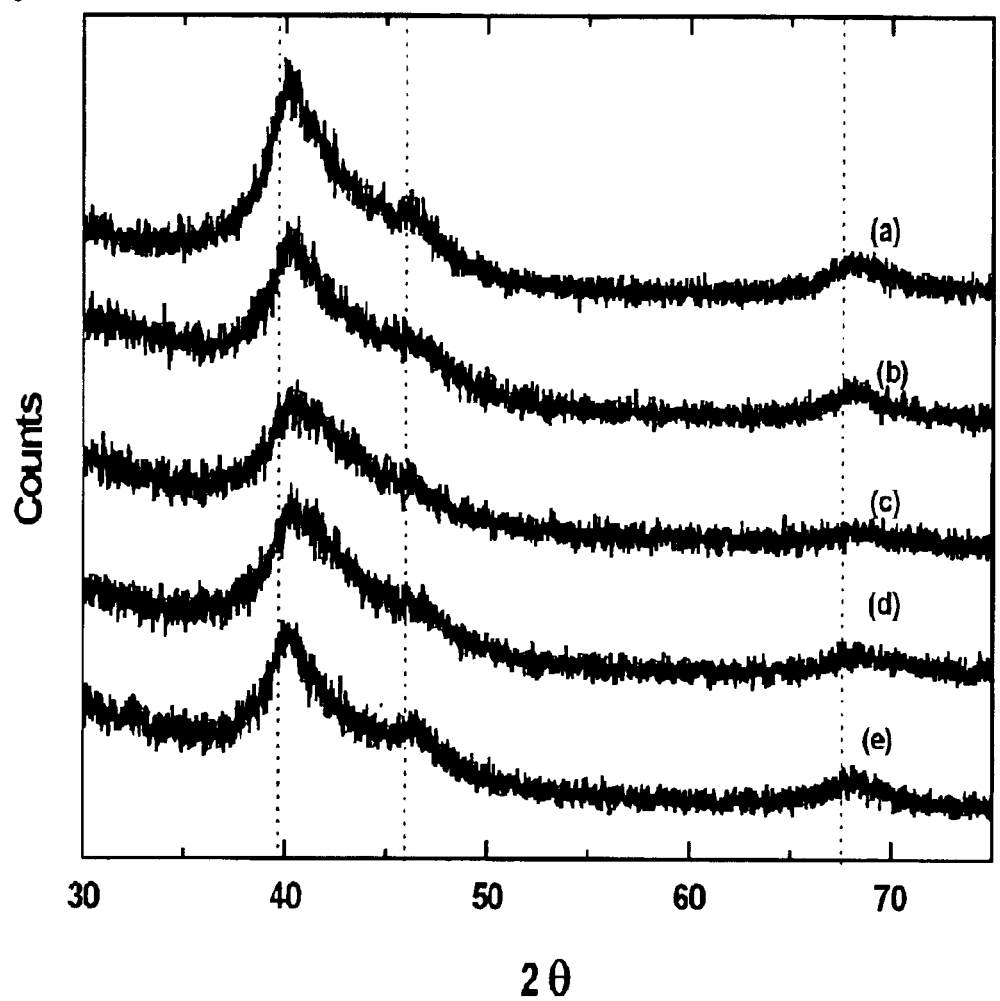
FIG. 6 shows X-ray diffraction (XRD) patterns of Pt—Ru—Ni—Os quaternary metal catalysts according to the present invention depending on a change in 2.

FIG. 6 shows X-ray diffraction (XRD) patterns of the synthesized metal catalysts having various molar compositions, in which Pt, Ru, Ni and Os catalysts are mixed in molar ratios of (a) 5:4:0.5:0.5, (b) 4:4:1:1, (c) 6:1:1:1, and (d) 5:2:2:1.

Figure 7:
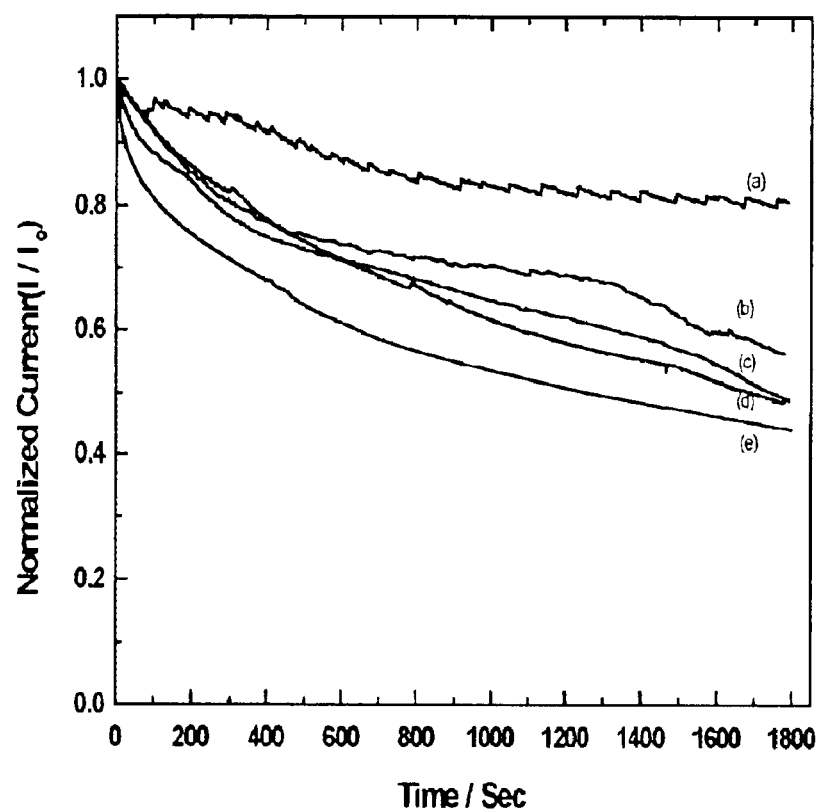
FIG. 7 shows normalized current densities for the Pt—Ru—Ni—Os quaternary metal catalysts according to the present invention.

FIG. 7 shows normalized current densities for the Pt—Ru—Ni—Os quaternary metal catalysts according to the present invention, in which Pt, Ru, Ni and Os catalysts are mixed in molar ratios of (a) 5:2:2:1, (b) 4:4:1:1, (c) 5:4:0.5:0.5, and (d) 6:1:1:1.

Table 3 shows onset voltages at which methanol oxidation by the quaternary metal catalysts are initiated, according to various compositions. Referring to Table 3, onset voltages of the Pt—Ru—Ni—OS quaternary metal catalysts are lower than that of the conventional Pt—Ru binary anode catalyst, which was 0.291 V, providing better catalytic activity than the conventional catalyst.

TABLE 3

Onset voltages of Pt—Ru—Ni—Os catalysts for methanol oxidation

| Molar ratio of Pt—Ru—Ni—Os | Onset voltage [V] |
| --- | --- |
| (a) 5:4:0.5:0.5 | 0.258 |
| (b) 4:4:1:1 | 0.232 |
| (c) 6:1:1:1 | 0.290 |
| (d) 5:2:2:1 | 0.250 |
| (e) 6.5:2.5:0.5:0.5 | 0.236 |

FIG. 7 is a graphical representation for comparing normalized current changes at 0.3V measured for 30 minutes with applying same condition explained in Example 1. In FIG. 7, Pt—Ru—Ni—Os catalysts are mixed in molar ratios of (a) 5:4:0.5:0.5, (b) 4:4:1:1, (c) 6:1:1:1, (d) 5:2:2:1, and 6.5:2.5:0.5:0.5. The comparison results showed stability of the synthesized catalysts under the condition of applying voltages to electrodes.

COMPARATIVE EXAMPLE 1

Performance Test of a Single Cell Using Pt—Ru Binary Anode Catalyst

Based on the onset voltage results of Exampe 1 through 3, Pt—Ru—Rh—Ni(5:4:0.5:0.5) showed low onset potential and the stability of current at constant voltage on methnol oxidation was tested on a single cell. This performance data was compared the PtRu catalyst prepared by the below synthetic procedure.

The Pt—Ru catalyst in a molar ratio of 1:1 was prepared by pouring appropriate amounts of a Pt metal salt ($H_2PtCl_6 \cdot xH_2O$) and a Ru metal salt ($RuCl_3 \cdot xH_2O$) into distilled water, respectively, stirring at room temperature (approximately 25° C.) for 1 hour, followed by mixing the two metal salt solutions to produce a mixed solution thereof, and further stirring for 2 hours.

The pH of the mixed solution was adjusted to 8 and 3 times excess of stoichiometric demand of a 2 M $NaBH_4$ aqueous solution as a reducing agent was added thereto at a time, thereby reducing the metal salts to yield precipitates. The obtained precipitates were washed with distilled water three times and freeze-dried for 12 hours, thereby finally synthesized metal catalysts. Performance tests were carried out on the synthesized PtRu catalysts. The measurement results showed that the onset voltage at which methanol oxidation starts was 0.291 V with a standard hydrogen electrode as a reference electrode.

The onset voltages of the quaternary metal anode catalysts having combinations of transition metals according to the present invention prepared in Examples 1 through 3, were lower than the onset voltage of the conventional Pt—Ru binary metal catalyst, showing relatively better performance.

Figure 8:
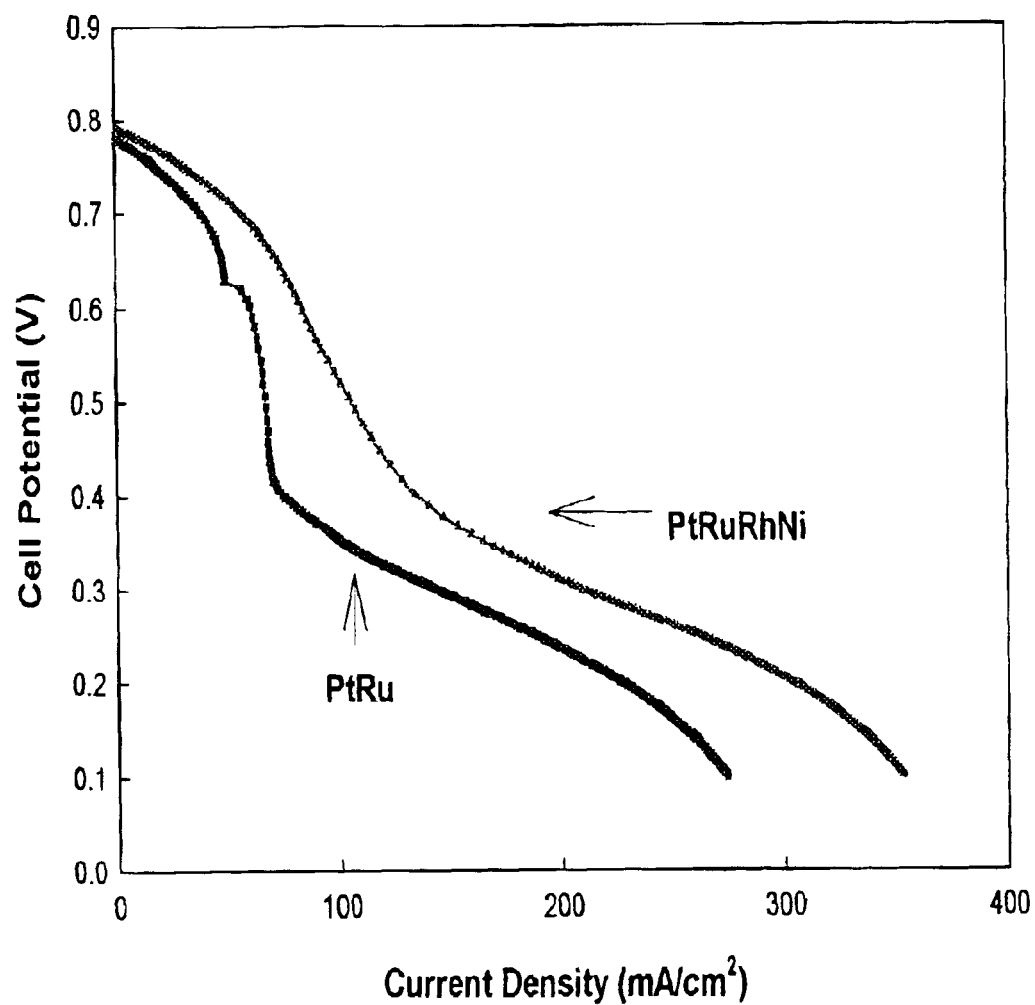
FIG. 8 shows the results of the performance of Pt—Ru—Rh—Ni quaternary metal catalyst compared with that of Pt—Ru catalyst synthesized by same procedure.

FIG. 8 graphically shows results of performance of Pt—Ru—Rh—Ni (4:4:1:1) quaternary metal catalyst according to the present invention, compared with Pt—Ru synthesized by above procedure under the condition that 2 M methanol is flowed at the anode and the air is flowed at the cathode.

The amount of anode and cathode loading is respectively 8 $mg/cm^2$ synthesized PtRu/PtRuRhNi and 3 $mg/cm^2$ of Pt from Johnson Matthey PLC. The membrane electrode assembly (MEA) is formed by the hot-press with the membrane (Nafion™ 115) between the anode and cathode. A tested unit cell had a dimension of 10.5 cm², and a methanol solution and air were supplied through a graphite channel at flow rates of 0.2–1.0 cc/min and 1000–2000 cc/min, respectively.

The results in FIG. 8 showed that whereas the use of the Pt—Ru binary catalyst at 0.3 V gave a current density of 144 mA/cm², the use of the Pt—Ru—Rh—Ni quaternary catalyst prepared in Example 1 gave a current density of 209 mA/cm², that is, improved performance by approximately 45%.

As described above, the Pt—Ru based quaternary metal catalyst according to the present invention has several advantages that an oxygen source for methanol oxidation is effectively provided, a CO bonding strength is weakened by changing the electronic structure between atoms, and methanol adsorption is enhanced to increase the catalytic activity. Also, the effective surface of the Pt—Ru based quaternary metal catalyst according to the present invention can be increased by impregnating the same in a catalyst converter substrate having a wide surface area, thereby reducing the amount of the catalyst used.

Further, since the onset voltage of a fuel cell having the Pt—Ru quaternary metal catalyst according to the present invention is lower than that of a fuel cell having the conventional Pt—Ru binary metal catalyst, a highly efficient direct methanol fuel cell (DMFC) can be manufactured.

Therefore, compared to the conventional Pt—Ru binary metal catalyst, the Pt—Ru quaternary metal catalyst according to the present invention can give high power density and can replace conventional catalysts.

What is claimed is:

1. A quaternary metal catalyst for a fuel cell comprising platinum (Pt), ruthenium (Ru), nickel (Ni) and osmium (Os).

2. The quaternary metal catalyst according to claim 1, wherein the Pt, Ru, Ni, and Os are contained in amounts of 40 to 70%, 10 to 40%, 5 to 20% and 5 to 20% by mole, respectively.

3. The quaternary metal catalyst according to claim 1, wherein the Pt, Ru, Ni and Os are contained in amounts of 40 to 65%, 10 to 40%, 5 to 20% and 5 to 10% by mole, respectively.

4. The quaternary metal catalyst according to claim 1, wherein the Pt, Ru, Ni and Os have molar ratios of 5:4:0.5:0.5.

5. The quaternary metal catalyst according to claim 1, wherein the Pt, Ru, Ni and Os have molar ratios of 4:4:1:1.

6. The quaternary metal catalyst according to claim 1, wherein the Pt, Ru, Ni and Os have molar ratios of 6:1:1:1.

7. The quaternary metal catalyst according to claim 1, wherein the Pt, Ru, Ni and Os have molar ratios of 5:2:2:1.

8. The quaternary metal catalyst according to claim 1, wherein the Pt, Ru, Ni and Os have molar ratios of 6.5:2.5:0.5:0.5.

9. A fuel cell electrode comprising a quaternary metal catalyst, the quaternary metal catalyst comprising platinum (Pt), ruthenium (Ru), nickel (Ni) and osmium (Os).

10. The fuel cell electrode according to claim 9, wherein the Pt, Ru, and Ni and Os are contained in amounts of 40 to 70%, 10 to 40%, 5 to 20% and 5 to 20% by mole, respectively.

11. The fuel cell electrode according to claim 9, wherein the Pt, Ru, Ni and Os are contained in amounts of 40 to 65%, 10 to 40%, 5 to 20% and 5 to 10% by mole, respectively.

12. A direct methanol fuel cell comprising the fuel cell electrode according to claim 9.

* * * * *